(12) United States Patent
Okamoto et al.

(10) Patent No.: US 6,727,635 B2
(45) Date of Patent: Apr. 27, 2004

(54) DRIVING DEVICE

(75) Inventors: Yasuhiro Okamoto, Tondabayashi (JP); Ryuichi Yoshida, Sakai (JP); Haruyuki Nakano, Sakai (JP)

(73) Assignee: Minolta Co., Ltd., Osaka (JP)

( * ) Notice: Subject to any disclaimer, the term of this patent is extended or adjusted under 35 U.S.C. 154(b) by 118 days.

(21) Appl. No.: 09/948,699

(22) Filed: Sep. 10, 2001

(65) Prior Publication Data
US 2002/0033322 A1 Mar. 21, 2002

(30) Foreign Application Priority Data

Sep. 11, 2000 (JP) ........................................ 2000-274814

(51) Int. Cl.$^7$ ............................................. H01L 41/08
(52) U.S. Cl. ............. 310/316.01; 310/315; 310/316.02; 310/323.02
(58) Field of Search ................... 310/316.01, 316.02, 310/323.02, 323.03, 315; 318/116, 118

(56) References Cited

U.S. PATENT DOCUMENTS

| | | | | |
|---|---|---|---|---|
| 4,513,219 A | * | 4/1985 | Katsuma et al. | ............. 310/328 |
| 4,560,263 A | * | 12/1985 | Katsuma et al. | ............. 396/133 |
| 5,101,144 A | * | 3/1992 | Hirotomi | ..................... 318/116 |
| 5,365,139 A | * | 11/1994 | Kasuga et al. | ......... 310/316.02 |
| 5,739,621 A | * | 4/1998 | Atsuta et al. | .......... 310/316.02 |
| 6,031,316 A | * | 2/2000 | Kataoka | ................. 310/316.02 |
| 6,285,145 B1 | * | 9/2001 | Otsubo et al. | .............. 318/114 |
| 6,401,519 B1 | * | 6/2002 | McFarland et al. | ........ 73/24.06 |
| 6,439,680 B1 | * | 8/2002 | Mochizuki et al. | ........... 347/10 |

FOREIGN PATENT DOCUMENTS

JP        3-98478        4/1991

* cited by examiner

Primary Examiner—Mark Budd
(74) Attorney, Agent, or Firm—McDermott, Will & Emery

(57) ABSTRACT

A smooth impact drive mechanism utilizing an electromechanical conversion element, in which a preheating voltage to preheat the electromechanical conversion element is impressed thereto before the impression of a drive voltage to the electromechanical conversion element, in order to realize stable drive characteristics by reducing fluctuation in the speed of the moving unit. In addition, drive parameters are changed in accordance with the temperature of the electromechanical conversion element. Furthermore, drive parameters are changed in accordance with the moving speed of the moving unit.

12 Claims, 12 Drawing Sheets

DRIVING DEVICE

This application is based on application No. JP 2000-274814 filed in Japan, the contents of which is hereby incorporated by reference.

BACKGROUND OF THE INVENTION

1. Field of the Invention

The present invention relates to an improved smooth impact drive mechanism (SIDM) that utilizes an electromechanical conversion element such as a piezoelectric element, and more particularly, to a smooth impact drive mechanism having improved stability. It further relates to an improved smooth impact drive mechanism that is capable of stable driving regardless of changes in the ambient environment such as changes in temperature.

2. Description of the Related Art

As a drive mechanism that utilizes an electromechanical conversion element such as a piezoelectric element that changes in length (i.e., extends and contracts) when the element is impressed with a voltage, a device such as that shown in the perspective view of FIG. 1(a), which shows the device in a disassembled fashion, and in the perspective view of FIG. 1(b), which shows the device in an assembled fashion, is known, for example.

This drive mechanism is capable of moving the moving unit 10 relative to the support platform 1, and may be used as the drive mechanism for the lens of a camera, for example. In other words, if the moving unit 10 is connected to the lens holder, the lens held in the lens holder may be moved together with the moving unit 10.

The piezoelectric element 4 comprises a number of piezoelectric plates stacked together. One end 4a of its length is fixed to the support platform 1, while the other end 4b is fixed to one end 5a of the rod (vibration member) 5. The rod is movably supported by the support members 2 and 3 that are integrally formed on the support platform 1.

The moving unit 10 incorporates the rod 5 using the main body 11 and cap 12 thereof, and by applying a downward force to the main body 11 and cap 12 using the pressure spring 13, the moving unit 10 becomes frictionally engaged around the rod 5.

To the piezoelectric element 4 is connected a voltage control circuit (drive circuit) not shown in the drawings. When a pulse voltage, which may be expressed as a sawtooth waveform as shown in FIG. 2, is continuously impressed to the piezoelectric element 4, the piezoelectric element 4 vibrates, i.e., extends and contracts, and the rod 5 vibrates along its length based on the movements of the piezoelectric element 4. Specifically, the piezoelectric element 4 extends relatively slowly at the gentle rising edge 101 of the first waveform 100, so that the rod 5 slowly moves in the direction of the arrow A in FIG. 1(b). When the voltage is suddenly dropped (as represented by the waveform portion indicated by the falling edge 102), the piezoelectric element 4 rapidly contracts and returns to its original length, whereupon the rod 5 rapidly moves in the direction of the arrow B.

Where the voltage is continuously applied such that identical waves 100, 100', . . . are repeated, the rod 5 continues to vibrate while it repeats the slow movement in the direction A and the rapid movement in the direction B. In other words, the rod 5 vibrates while drawing a vibration waveform with gentle and steep portions. Here the spring force of the pressure spring 13 of the moving unit 10 (i.e., the frictional engagement of the moving unit 10 with the rod 5) is adjusted such that the moving unit 10 moves together with the rod 5 when the rod 5 moves slowly, and remains stationary (or moves over a smaller distance than the rod 5) due to inertia when the rod 5 moves rapidly. Therefore, while the rod 5 vibrates, the moving unit 10 moves in the direction A relative to the support platform 1.

Where the moving unit 10 is to be moved in the direction of the arrow B in FIG. 1(b), the pulse waveform of the voltage impressed to the piezoelectric element should be replaced with the one that is shown in FIG. 2 and that includes sharp rising edges and gentle falling edges. The principle of the movement of the moving unit 10 is the same as in the case explained above.

Incidentally, in a drive mechanism that utilizes an electromechanical conversion element, even if the drive waveform is unchanged, the moving speed of the moving unit may change based on the temperature of the electromechanical conversion element. FIG. 3 explains this nature, and shows that the moving speed of the moving unit increases as the temperature rises. In other words, because when driven continuously the temperature of the electromechanical conversion element increases as the time passes, its drive characteristics change over time.

The cause of the characteristic change shown in FIG. 3 may be fluctuation in the capacity of the electromechanical conversion element that occurs with a change in temperature. As shown in FIG. 4, the capacity declines as the temperature falls. Because the generated force of the electromechanical conversion element is proportional to the product of the capacity and size of the element, as the capacity declines, the generated force also declines, and as a result, the moving speed of the moving unit is reduced. 'Capacity' is the potential energy of the electromechanical conversion element, and is proportional to the dielectric constant of the element. Because the dielectric constant declines as the temperature declines, the capacity also declines as a result.

OBJECTS AND SUMMARY

The present invention was created in view of the above circumstances, and an object thereof is to provide an improved smooth impact drive mechanism that utilizes an electromechanical conversion element, and more particularly, to provide improved stability. Another object of the present invention is to make improvement such that stable driving may be ensured regardless of changes in the ambient environment such as the temperature, i.e., to reduce fluctuation in the drive characteristics over time.

In order to attain these and other objects, the smooth impact drive mechanism according to one aspect of the present invention has a support platform, an electromechanical conversion element that is fixed to the support platform via one end thereof, a vibration member that is fixed to the other end of the electromechanical conversion element, a moving unit that is engaged with the vibration member using a prescribed frictional force, and a controller that controls the electromechanical conversion element and causes the moving unit to move relative to the support platform by causing the electromechanical conversion element to vibrate at different speeds depending on the direction of the vibration member, i.e., in the direction of extension or the direction of contraction, wherein the controller preheats the electromechanical conversion element before performing driving to move the moving unit. As one method of preheating, the controller impresses a preheating voltage to the electromechanical conversion element. The voltage impressed for the purpose of preheating has a drive waveform that does not as a practical matter move the moving unit. One specific example of such a drive waveform includes rising edges and falling edges that have the same angle of slant.

As described above, in general the characteristics of electromechanical conversion elements such as piezoelectric elements change in accordance with the temperature, such that the speed of the moving unit declines as the temperature declines. In the smooth impact drive mechanism of the present invention having the above construction, the electromechanical conversion element is preheated before the moving unit is actually driven, and therefore fluctuation in the speed of the moving unit may be reduced as a result, enabling the realization of stable drive characteristics with little speed fluctuation due to temperature change.

The smooth impact drive mechanism according to another aspect of the present invention has a temperature sensor that measures the temperature of the electromechanical conversion element, and the controller changes the drive waveform by which the electromechanical conversion element is driven in accordance with the output from the temperature sensor. As a specific example, the controller impresses the electromechanical conversion element with a voltage to preheat it until the output from the temperature sensor reaches a prescribed value. Alternatively, the controller impresses a preheating voltage for a prescribed period of time depending on the output from the temperature sensor at the time of startup of the device that incorporates the drive mechanism of the present invention. As another specific example, where the output from the temperature sensor is lower than the prescribed value, the controller increases the amplitude of the drive voltage or the drive frequency, and where the output from the temperature sensor equals or is higher than the prescribed value, the controller reduces the amplitude of the drive voltage or the drive frequency.

The smooth impact drive mechanism according to yet another aspect of the present invention has a speed sensor that detects the moving speed of the moving unit, and the controller changes the drive waveform by which the electromechanical conversion element is driven in accordance with the output from the speed sensor. As a specific example, where the moving speed of the moving unit, which is indicated by the output from the speed sensor, is lower than the prescribed value, the controller increases the amplitude of the drive voltage or the drive frequency, and where the moving speed equals or is higher than the prescribed value, the controller reduces the amplitude of the drive voltage or the drive frequency.

Using the above construction, the smooth impact drive mechanism can drive the moving unit at a stable speed despite such disturbances as fluctuations in temperature, etc.

BRIEF DESCRIPTION OF THE DRAWINGS

These and other objects and features of the present invention will become apparent from the following description of preferred embodiments thereof taken in conjunction with the accompanying drawings, in which.

In the following description, like parts are designated by like reference numbers throughout the several drawings.

DETAILED DESCRIPTION OF THE PREFERRED EMBODIMENTS

Figure 5:
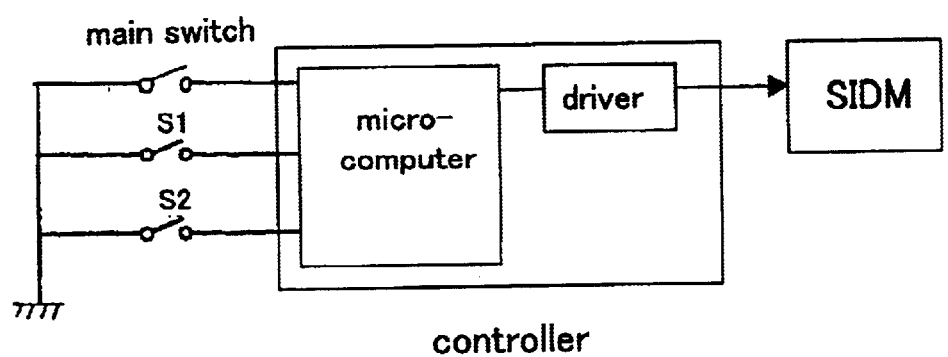
FIG. 5 is a block diagram of a camera equipped with the smooth impact drive mechanism pertaining to one embodiment of the present invention.

An example of the use of the smooth impact drive mechanism of the present invention is explained in detail below with reference to the accompanying drawings. FIG. 5 is a block diagram to explain the control of a camera equipped with the smooth impact drive mechanism of the present invention.

Figure 1:
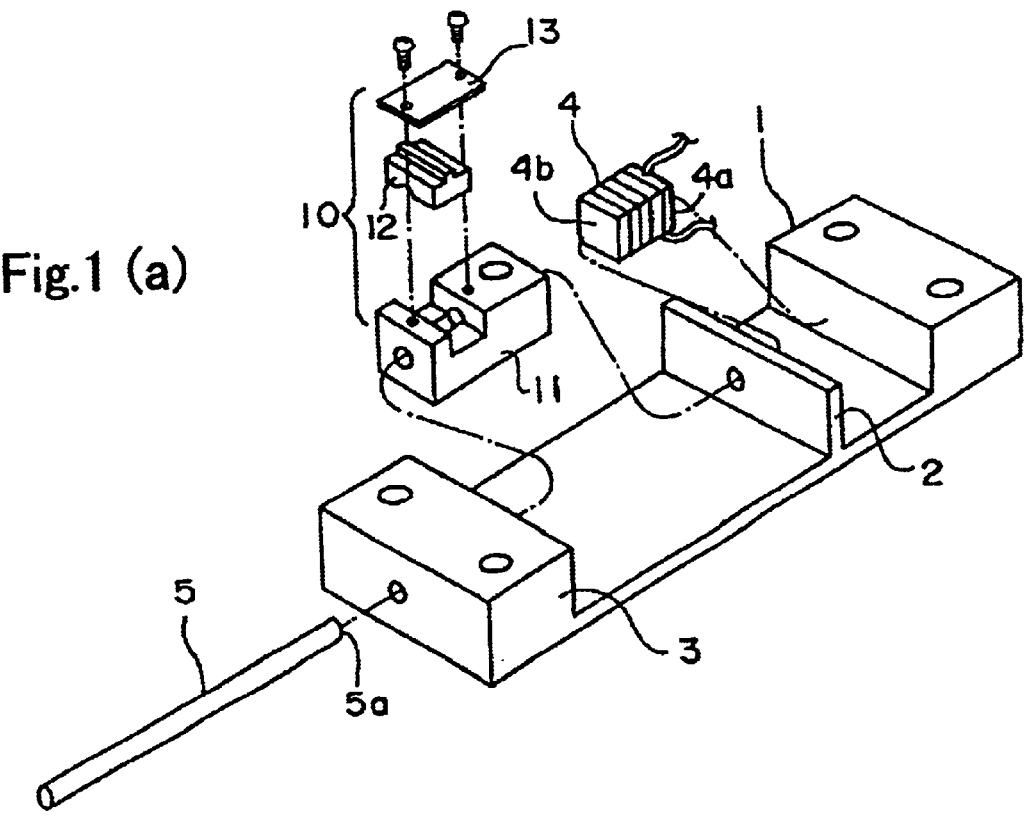
FIG. 1 shows drawings in a disassembled and assembled fashion, respectively, of a conventional drive mechanism utilizing a piezoelectric element.
Figure 1:
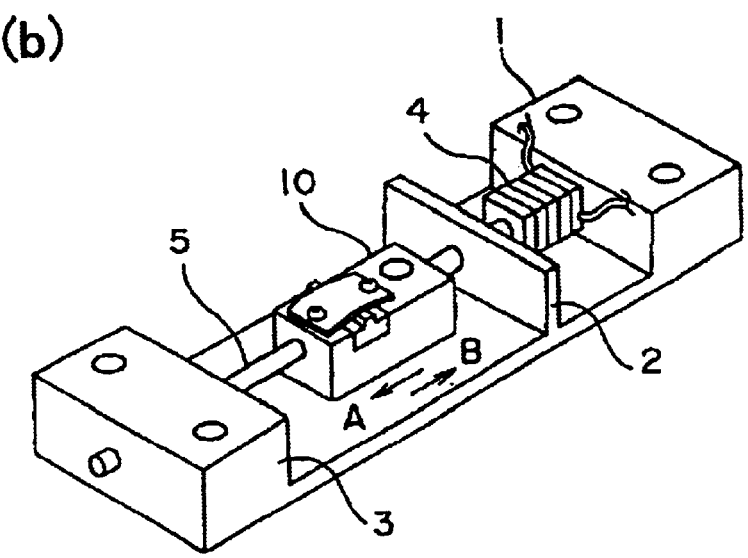
Figure 2:
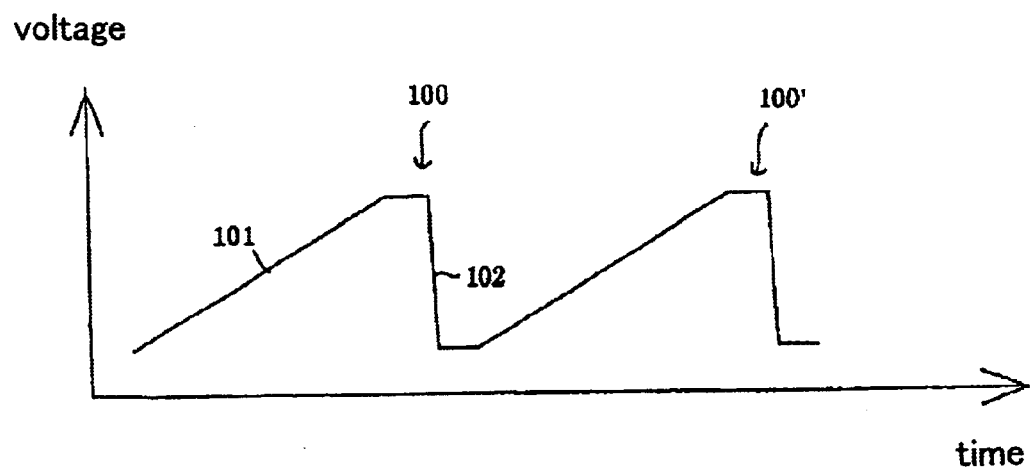
FIG. 2 is a graph showing the pulse waveform of the voltage impressed to the smooth impact drive mechanism shown in FIG. 1.
Figure 3:
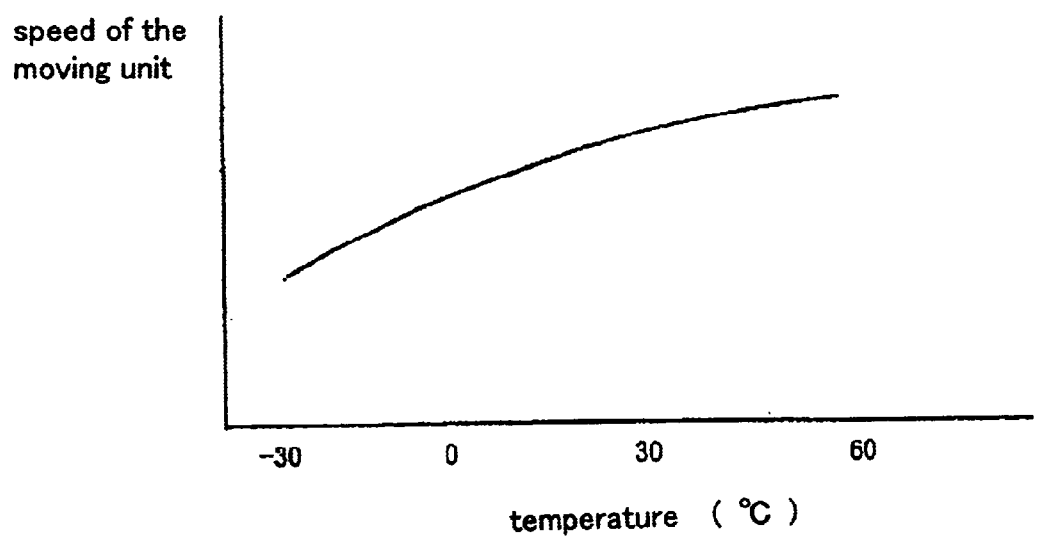
FIG. 3 is a graph showing the relationship between the temperature of the piezoelectric element and the speed of the moving unit.
Figure 4:
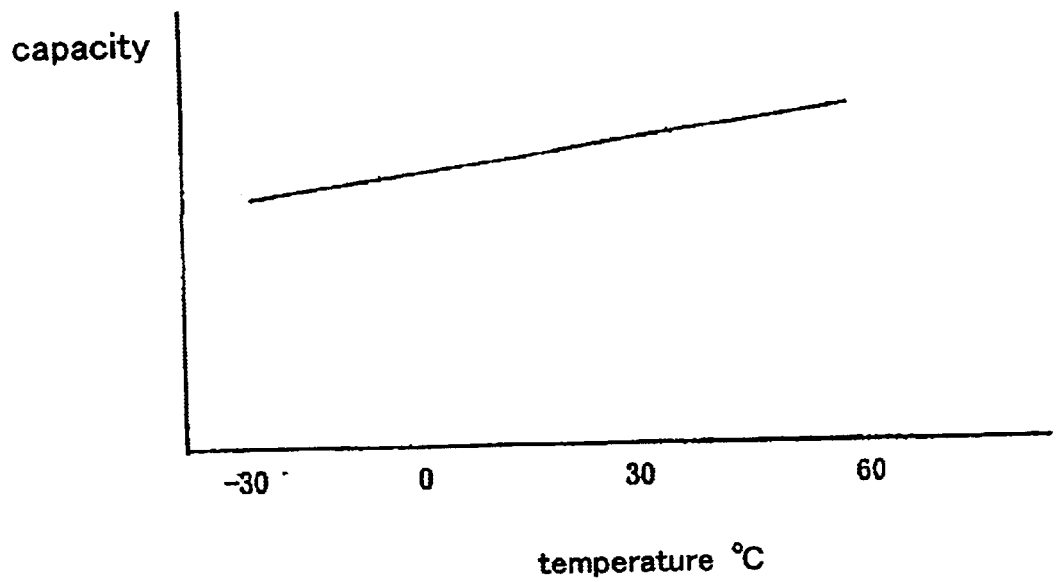
FIG. 4 is a graph showing the relationship between the capacity and the temperature of the piezoelectric element.

In the block diagram, the part indicated as SIDM comprises the same drive mechanism as the one shown in FIG. 1. The smooth impact drive mechanism of the present invention is identical to the one shown in FIG. 1 as far as its mechanical construction of the drive portion is concerned. The present invention is characterized by its method to control the voltage impressed to the electromechanical conversion element. The controller has a microcomputer that executes programs and a microcomputer-controlled driver that impresses voltage to the piezoelectric element. The main switch is a power switch to start up the camera itself, S1 is a switch that begins distance measurement through an auto-focus sensor and through driving of the focusing lens based on the information from the sensor, and S2 is a switch that begins driving of the shutter for photo-taking.

When the switch S1 is turned ON through pressing of the shutter release button halfway down, auto-focus control begins, whereupon a drive voltage is impressed from the driver in the controller to the SIDM, and the lens moves as a result (main driving). In the present invention, prior to this main driving, a preheating voltage is impressed to the SIDM when the camera's main switch is turned ON.

Figure 6:
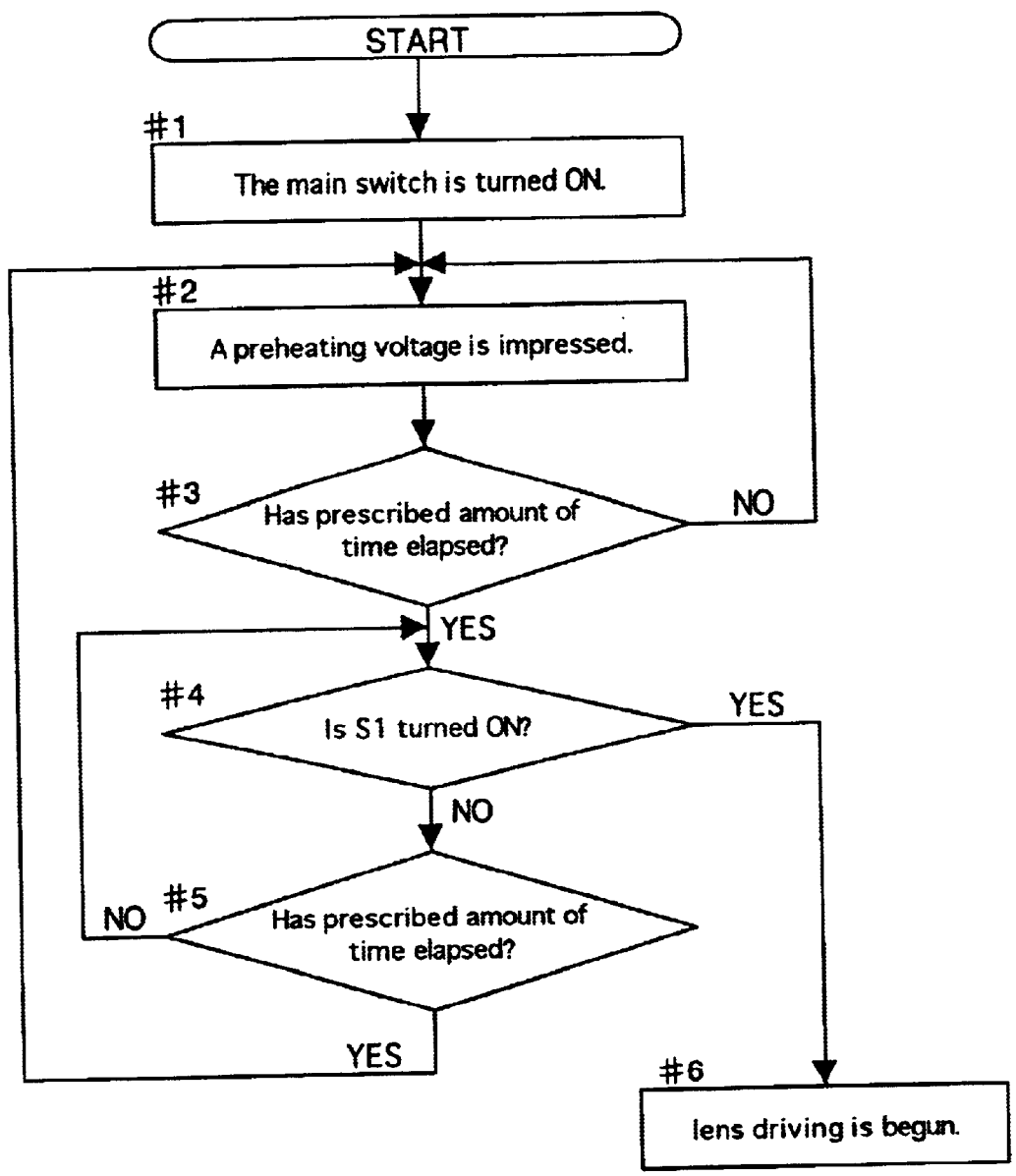
FIG. 6 is a flow chart showing the operation of the smooth impact drive mechanism pertaining to one embodiment of the present invention.

The sequence of this operation is shown using the flow chart of FIG. 6. When the main switch is turned ON in #1, a preheating voltage is impressed in #2. It is checked in #3 whether a prescribed amount of time has elapsed, and if the answer is yes, the microcomputer waits in #4 for an input indicating that S1 is turned ON. When S1 is turned ON, lens driving is begun in #6. Where a prescribed amount of time has elapsed in the standby step of #6, it may be assumed, as indicated in #5, that the temperature of the piezoelectric element has declined once more, and the microcomputer may return to #2 to perform preheating once again. In this case, the operation is such that preheating is carried out at regular intervals even when S1 is not turned ON as long as the main switch is ON. In addition, although not shown in the flow chart, where priority is placed on the turning ON of S1, the sequence may be interrupted by a command to turn S1 ON even if preheating of the piezoelectric element is not sufficient, so that lens driving is begun. It is also acceptable if the preheating voltage continues to be impressed until S1 is turned ON.

Where the SIDM includes a temperature sensor, described below, and detects the temperature of the piezoelectric element, this impression of voltage for the purpose of preheating may be carried out until the output from the temperature sensor reaches a prescribed value. In that case, the same sequence is followed as in the flow chart of FIG. 6, except that the microcomputer waits in #3 for the piezoelectric element to reach a prescribed temperature, instead of for a prescribed amount of time to elapse.

It is also acceptable if the temperature of the piezoelectric element is measured when the main switch is turned ON and a preheating voltage is impressed for a prescribed amount of time corresponding to the measured temperature.

Figure 7:
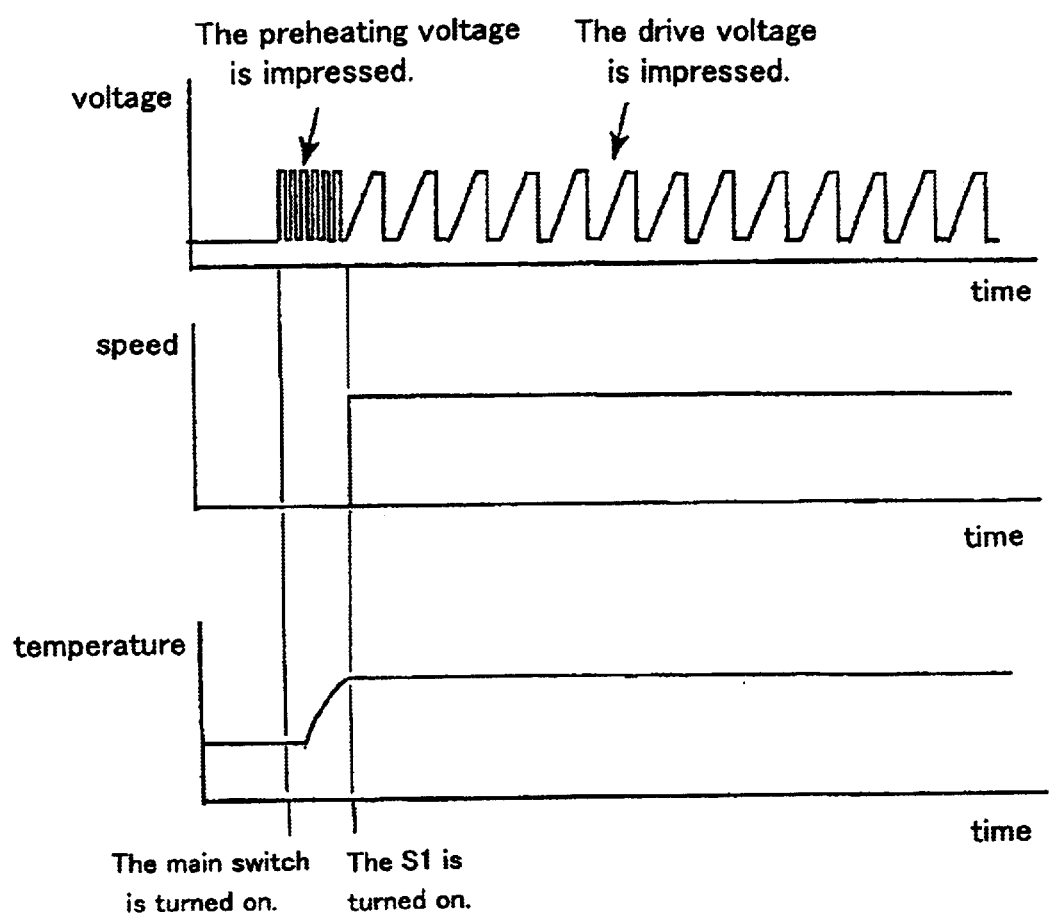
FIG. 7 comprises graphs that explain the relationships between the voltage, the speed of the moving unit and the temperature of the piezoelectric element when a preheating voltage is impressed.

The preheating voltage is impressed in order to preheat the piezoelectric element of the SIDM, so that the initial temperature of the piezoelectric element for main driving may be increased. Consequently, the temperature of the piezoelectric element during the drive may be maintained at uniform level, so that the speed of the moving unit (i.e., the moving speed of the lens) during the same period may be made uniform. FIG. 7 shows this principle graphically. When the main switch is turned ON, the preheating voltage is impressed, and the drive voltage is impressed when S1 is turned ON.

The preheating voltage should not be such that the lens moves as a practical matter when it is impressed. Therefore, the preheating voltage has a waveform of pulses that have symmetrical left and right portions. In other words, the slope of the rising edge and the slope of the falling edge of each pulse are identical. Consequently, the rod (see FIG. 1) that vibrates back and forth moves at the same speed when it moves forward and when it moves backward, so that the voltage may be impressed to the piezoelectric element without moving the lens as a practical matter. In FIG. 7, each pulse of the preheating voltage has a rectangular configuration, but it may also have the configuration of a horizontally symmetrical trapezoid or an isosceles triangle.

Figure 8:
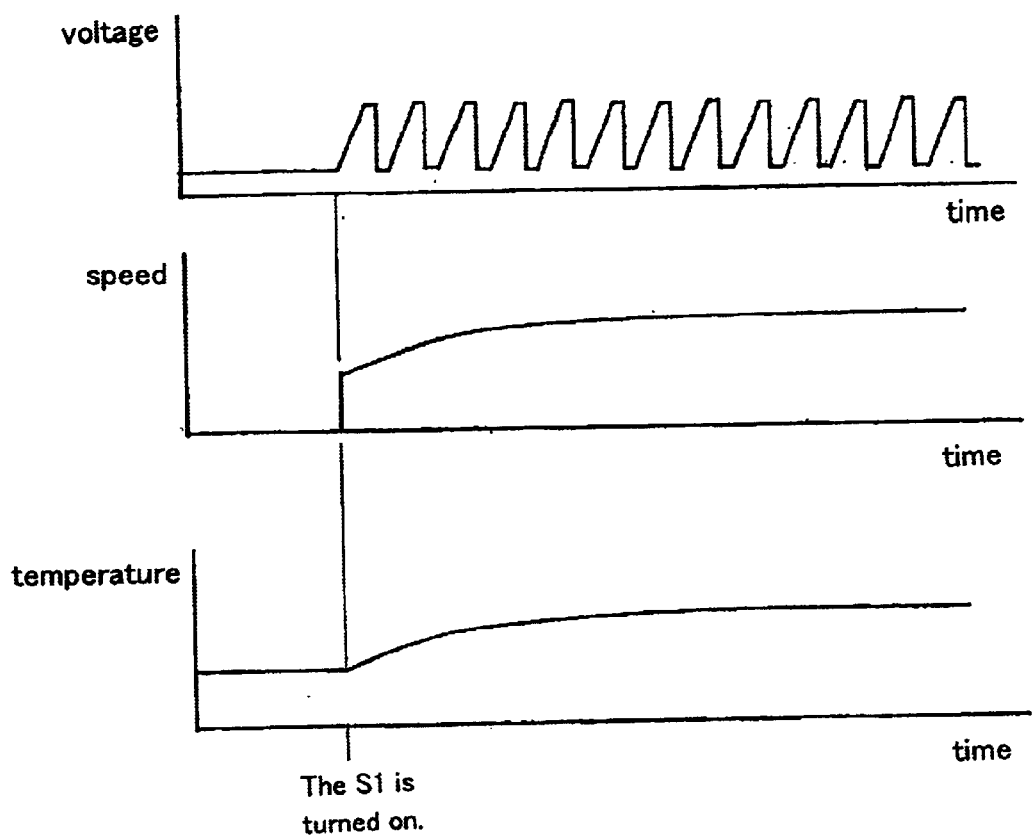
FIG. 8 comprises graphs that explain the relationships between the voltage, the speed of the moving unit and the temperature of the piezoelectric element when a preheating voltage is not impressed.

FIG. 8 shows a situation in which a preheating voltage was not impressed, as opposed to FIG. 7, in order to show the effect of the present invention. In FIG. 8, voltage is impressed to the piezoelectric element only when S1 is turned ON, and therefore the temperature of the piezoelectric element is low at the initial stage of driving, and the temperature thereof rises as driving continues. As a result, it is seen that even though the waveform of the impressed voltage is unchanged, the moving speed of the lens changes over time.

In the example shown in the drawings, the SIDM is used for lens driving during auto-focus control, and a preheating voltage is impressed to the piezoelectric element when the camera's main switch is turned ON. The present invention is not limited to this embodiment, however, and may be applied in an automobile extendable antenna or to the driving of a section of a microscope, for example. In other words, the basic principle is that a voltage to preheat the piezoelectric element is impressed before the object to be driven is driven through the impression of a voltage to the piezoelectric element.

Figure 9:
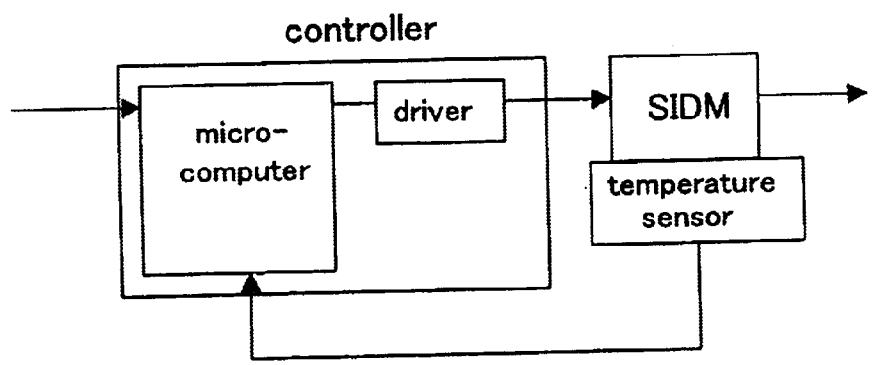
FIG. 9 is a block diagram that explains an embodiment that reduces the speed fluctuation of the moving unit by using the temperature detected by the temperature sensor.

Another embodiment of the present invention will now be explained. It has already been explained that the characteristics of the piezoelectric element change as the temperature thereof changes. In the embodiment described below, the impressed voltage is controlled by detecting the temperature of the piezoelectric element using a temperature sensor in order to enable compensation for the fluctuation in its characteristics caused by differences in temperature. FIG. 9 is a block diagram to explain this embodiment. Because the temperature sensor detects the temperature of the piezoelectric element included in the SIDM, it is preferably located as close to the piezoelectric element as possible. The microcomputer selects the appropriate drive method in accordance with the detected temperature, and impresses a drive voltage to the piezoelectric element through the driver.

Figure 10:
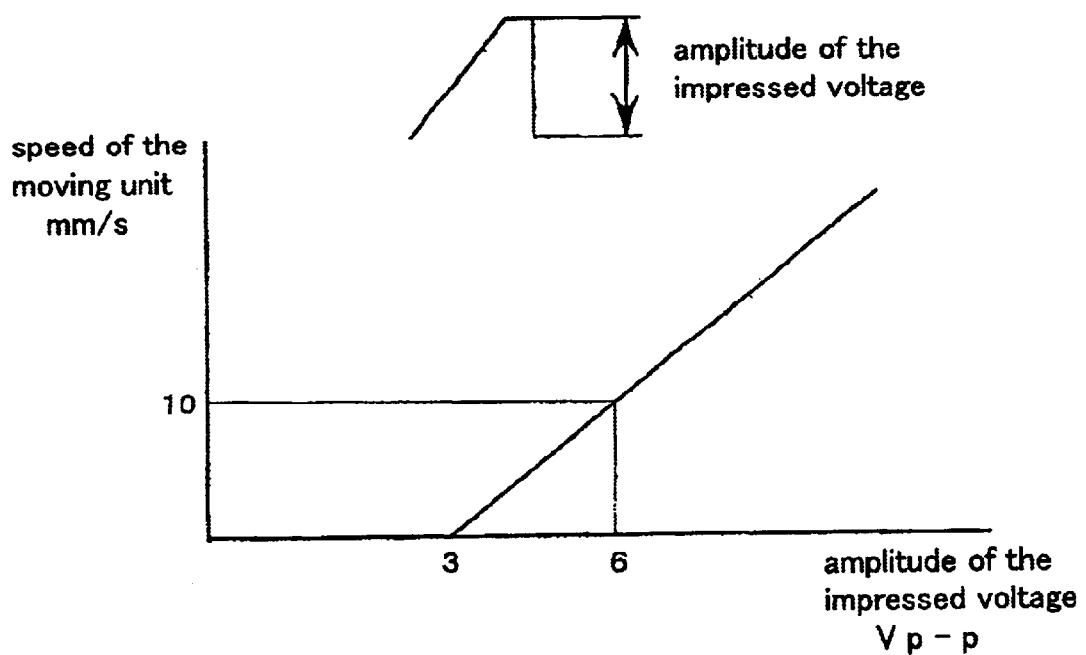
FIG. 10 is a graph that shows the relationship between the amplitude of the impressed voltage and the speed of the moving unit.

An example in which compensation for fluctuation in the characteristics of the piezoelectric element due to temperature change is carried out through a change in the amplitude of the impressed voltage will first be explained. As shown in FIG. 10, in the SIDM of the present invention, the larger the amplitude of the impressed voltage, the larger the moving speed of the moving unit. It is seen from the graph in FIG. 10 that when the amplitude of the waveform of the drive voltage exceeds 3 volts, the speed of the moving unit increases in proportion to the amplitude.

As described above, if the temperature of the piezoelectric element is low the drive speed is reduced, even if a voltage having the same waveform is impressed. Therefore, the amplitude of the voltage impressed to the piezoelectric element is increased when the temperature thereof is low, and as a result, the same drive speed as when the temperature of the piezoelectric element is at a normal level is obtained when the temperature of the element is lower.

Figure 11:
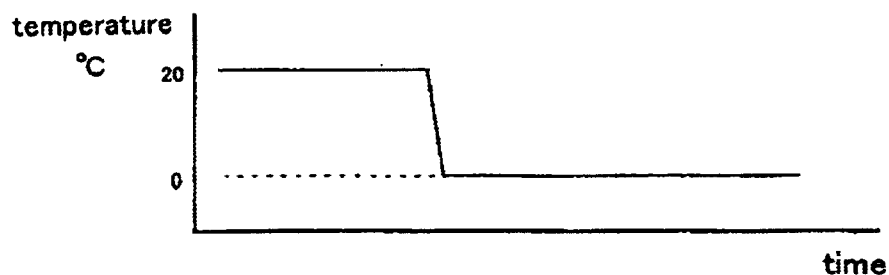
FIG. 11 comprises graphs that explain an example in which the fluctuation in the speed of the moving unit may be reduced by changing the amplitude of the impressed voltage.
Figure 11:
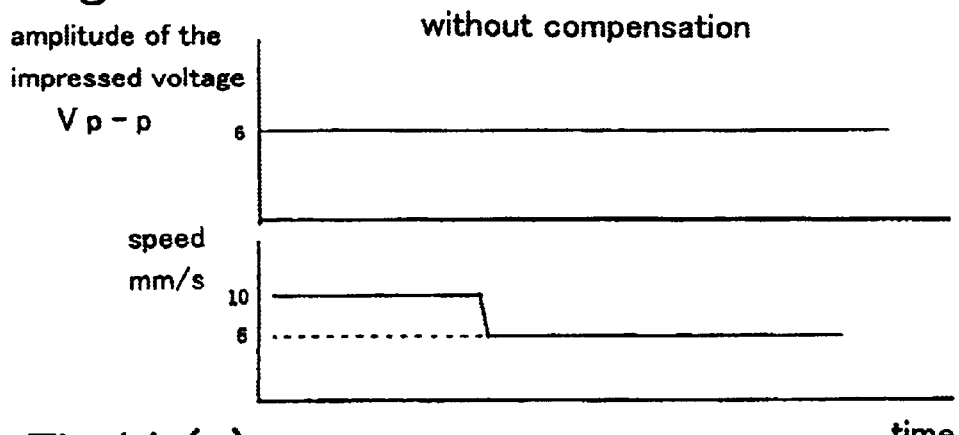
Figure 11:
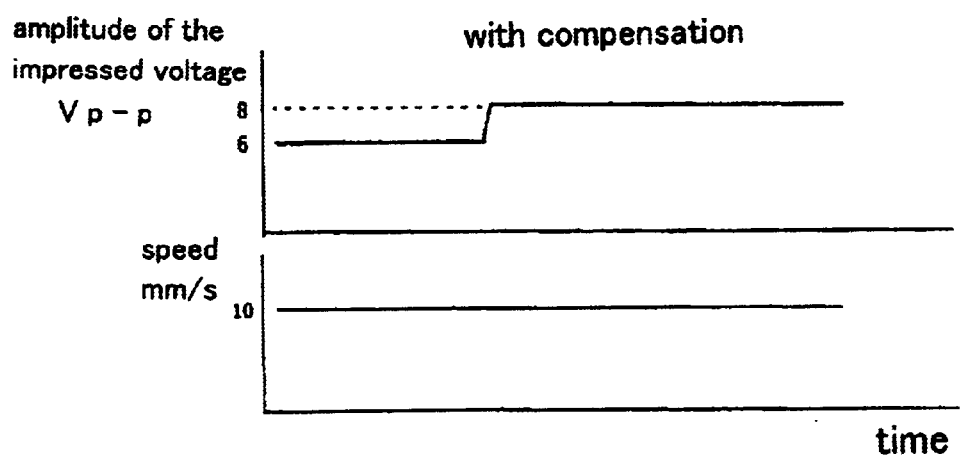

The effect obtained due to such compensatory control will be explained with reference to FIG. 11. FIG. 11(A) shows a change in the ambient temperature detected by the temperature sensor. It is shown that the temperature drops from 20° C. to 0° C. during driving.

FIG. 11(B) shows the speed of the moving unit when a voltage having a certain amplitude (6 volts) continues to be impressed without the occurrence of compensatory control using a temperature sensor in the above temperature change situation. It is seen that as the temperature drops, the speed of the moving unit also declines. On the other hand, FIG. 11(C) shows the speed of the moving unit when the amplitude of the impressed voltage is increased significantly from 6 volts to 8 volts when the ambient temperature decreases. The speed of the moving unit is constant regardless of the drop in the temperature change.

As is clear from the comparison of FIG. 11(B) and FIG. 11(C), the speed of the moving unit may be maintained at a constant level through control of the amplitude of the impressed voltage in accordance with the change in temperature.

Figure 12:
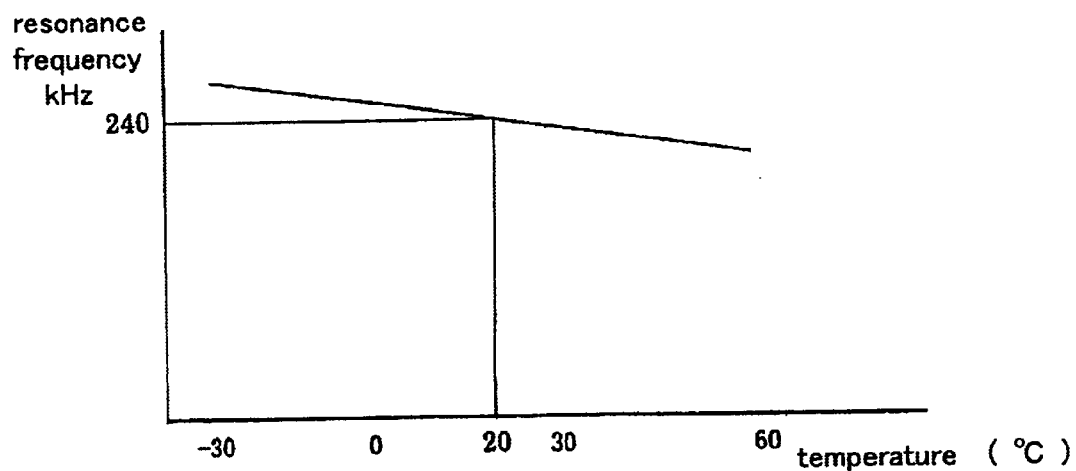
FIG. 12 is a graph that explains the relationship between the temperature of the piezoelectric element and the resonance frequency.
Figure 13:
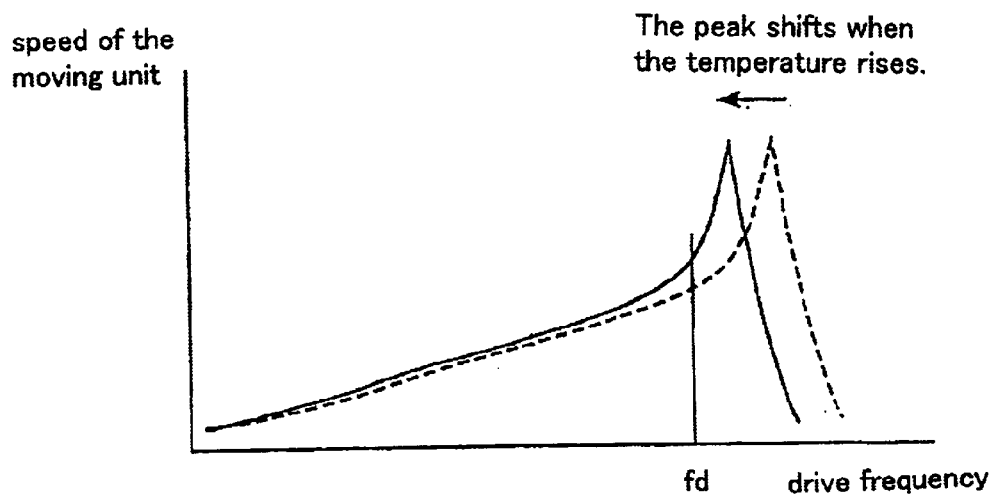
FIG. 13 is a graph that explains the relationship between the frequency of the drive voltage impressed to the piezoelectric element and the speed of the moving unit using temperature as the parameter.
Figure 14:
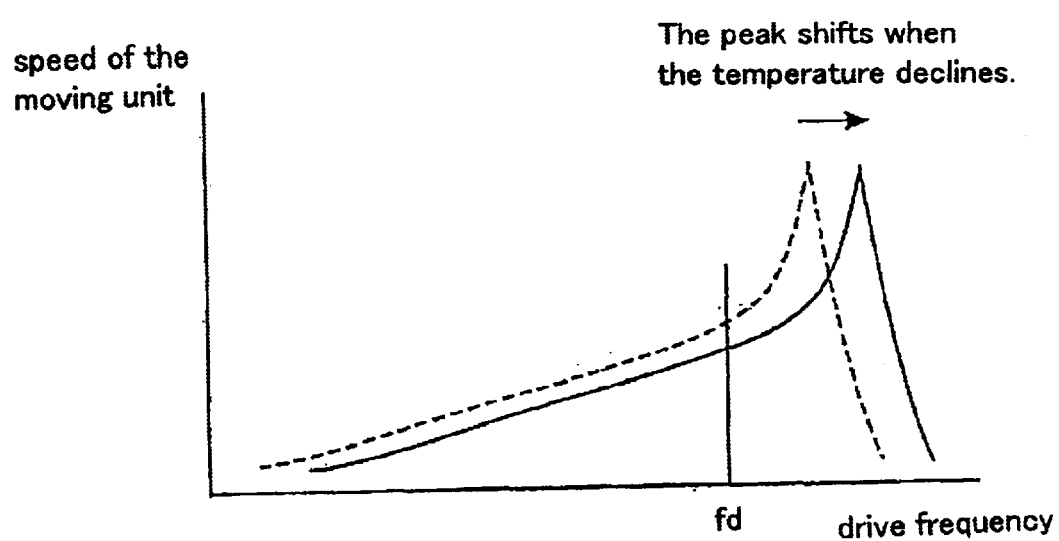
FIG. 14 is a graph that explains the relationship between the frequency of the drive voltage impressed to the piezoelectric element and the speed of the moving unit using temperature as the parameter.

An example in which compensation for fluctuation in the characteristics of the piezoelectric element due to temperature change is carried out through changing of the frequency of the impressed voltage will now be explained. FIG. 12 shows the relationship between the temperature of the piezoelectric element and the resonance frequency. It is seen that as the temperature increases, the resonance frequency declines. In other words, as shown in FIGS. 13 and 14, in the graph that shows the relationship between the drive frequency and the speed of the moving unit, the resonance point (the peak in the graph) shifts to the left when the temperature rises and shifts to the right when the temperature declines. From this, it is seen that in order to maintain the speed of the moving unit at a constant level even when the temperature changes, the frequency should be reduced when the temperature rises, and should be increased when the temperature drops.

Figure 15:
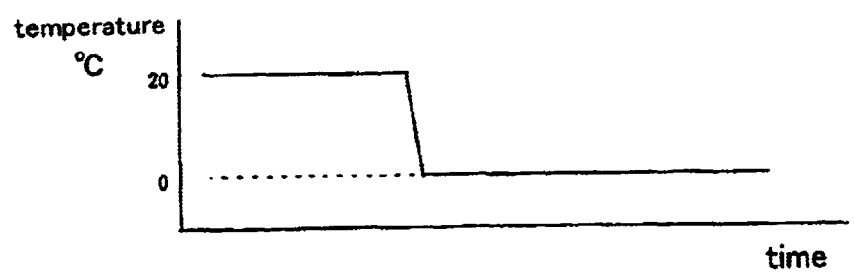
FIG. 15 comprises graphs that explain an example in which the fluctuation in the speed of the moving unit may be reduced by changing the frequency of the impressed voltage.
Figure 15:
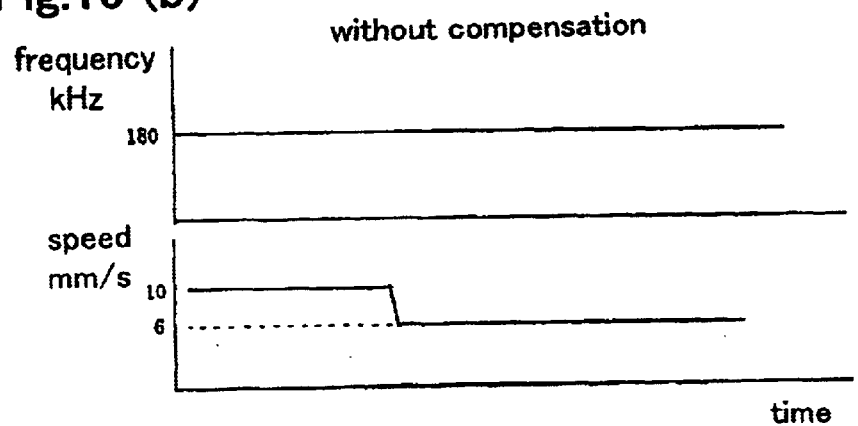
Figure 15:
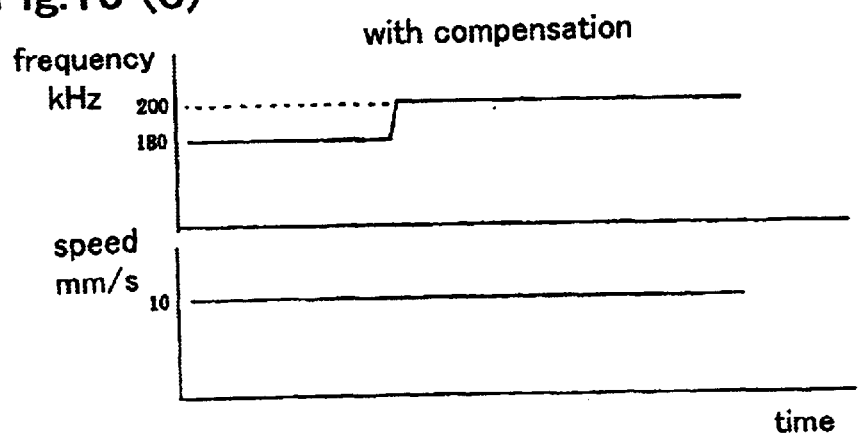

FIG. 15 shows the effect obtained from compensatory control using this fact. FIG. 15(A) shows a change in the ambient temperature as detected by the temperature sensor. It is shown that the temperature drops from 20° C. to 0° C. during driving.

FIG. 15(B) shows the speed of the moving unit when a voltage having a certain frequency (180 kHz) continues to be impressed without the performance of compensatory control using a temperature sensor in the above temperature change situation. It is seen that as the temperature drops, the speed of the moving unit also declines. On the other hand, FIG. 15(C) shows the speed of the moving unit when the frequency of the impressed voltage is increased significantly from 180 kHz to 200 kHz when the ambient temperature falls. The speed of the moving unit is constant regardless of the drop in the temperature change.

As is clear from the comparison of FIG. 15(B) and FIG. 15(C), the speed of the moving unit may be maintained at a constant level through control of the frequency of the impressed voltage in accordance with the temperature change.

Figure 16:
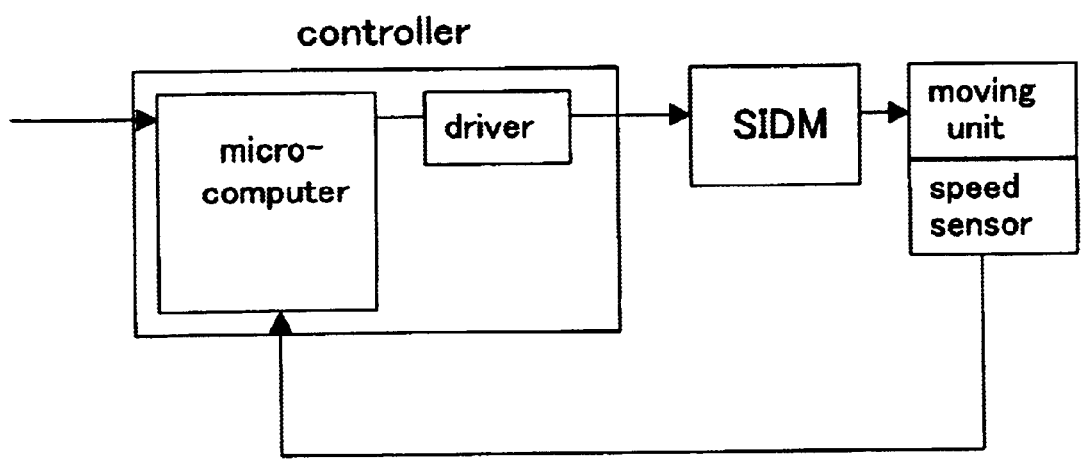
FIG. 16 is a block diagram that explains an example in which the fluctuation in the speed of the moving unit is reduced through detection of the direction thereof.

FIG. 16 is a block diagram showing yet another embodiment of the present invention. In the embodiments explained above, the temperature was detected using a temperature sensor, and the speed of the moving unit was maintained at a constant level through compensation for the fluctuation in the characteristics of the piezoelectric element caused by the temperature change. In contrast, in this embodiment, the speed of the moving unit itself is directly detected by a sensor, and control is carried out such that the speed is maintained at a constant level. Detection of the speed may be obtained using the amount of displacement per unit of time detected a public-domain contact or non-contact displacement sensor. Where the SIDM is used for lens driving during auto-focus control, the moving speed of the moving unit, i.e. the moving speed of the focusing lens, may be sought from the amount of change per unit of time in the defocus amount that is obtained using an auto-focus sensor.

With reference to FIG. 16, the speed of the moving unit connected to the SIDM is directly detected by the speed sensor, and is fed back to the microcomputer.

In other words, where for some reason the speed of the moving unit is lower than a prescribed value, the amplitude or frequency of the drive voltage is increased, or both are increased such that the detected speed of the moving unit is the prescribed value. Conversely, where for some reason the speed of the moving unit equals or is larger than a prescribed value, the amplitude or frequency of the drive voltage is reduced, or both are reduced such that the detected speed of the moving unit is the prescribed value. Through this method, because the driving method is changed in accordance with the change in the moving speed of the moving unit due to not only temperature but also other causes, a more stable moving speed may be obtained.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A driving device comprising:

a support platform;

an electromechanical conversion element that is fixed to the support platform via one end thereof;

a vibration member that is fixed to the other end of the electromechanical conversion element;

a moving unit that is engaged with the vibration member using a prescribed frictional force; and a controller for controlling the electromechanical conversion element and causes the moving unit to move relative to the support platform by causing the electromechanical conversion element to vibrate at different speeds in the direction of extension or the direction of contraction depending on the direction of the vibration member, wherein the controller preheats the electromechanical conversion element before performing driving to move the moving unit.

2. The driving device according to claim 1, wherein the controller impresses a preheating voltage to the electromechanical conversion element for the purpose of preheating.

3. The driving device according to claim 2, wherein the voltage impressed for the purpose of preheating has a drive waveform that does not as a practical matter move the moving unit.

4. The driving device according to claim 3, wherein the drive waveform includes rising edges and falling edges that have the same angle of slant.

5. The driving device according to claim 4, wherein the drive waveform has a rectangular configuration.

6. The driving device according to claim 1, wherein the controller preheats the electromechanical conversion element at regular intervals.

7. The driving device according to claim 1, wherein the controller preheats the electromechanical conversion element continuously except when the controller drives the electromechanical conversion element for moving the moving unit.

8. The driving device according to claim 1, wherein the driving device is used in auto-focus lens.

9. The driving device according to claim 1 further comprising:
a temperature sensor for measuring the temperature of the electromechanical conversion element,
wherein the controller changes the drive waveform by which the electromechanical conversion element is driven in accordance with the output from the temperature sensor.

10. The driving device according to claim 9, wherein the controller impresses a preheating voltage to the electromechanical conversion element to preheat the electromechanical conversion element until the output from the temperature sensor reaches a prescribed value.

11. The driving device according to claim 9, wherein the controller impresses a preheating voltage for a prescribed period of time depending on the output from the temperature sensor at the time of startup of the device that incorporates the drive mechanism of the present invention.

12. A driving device comprising:
a support platform;
an electromechanical conversion element that is fixed to the support platform via one end thereof;
a vibration member that is fixed to the other end of the electromechanical conversion element;
a moving unit that is engaged with the vibration member using a prescribed frictional force;
a temperature sensor for measuring the temperature of the electromechanical conversion element, and
a controller for controlling the electromechanical conversion element and causes the moving unit to move relative to the support platform by causing the electromechanical conversion element to vibrate at different speeds depending on the direction of the vibration member, i.e., in the direction of extension or the direction of contraction,
wherein the controller changes the drive waveform by which the electromechanical conversion element is driven in accordance with the output from the temperature sensor, wherein
where the output from the temperature sensor is lower than the prescribed value, the controller increases the amplitude of the drive voltage or the drive frequency, and where the output from the temperature sensor is higher than the prescribed value, the controller reduces the amplitude of the drive voltage or the drive frequency.

* * * * *